United States Patent Office 3,184,471
Patented May 18, 1965

3,184,471
1,2'-BIBENZOTRIAZOLE COMPOUNDS AND THEIR PRODUCTION
Robert J. Harder, Wilmington, Del., assignor to E. I. du Pont de Nemours and Company, Wilmington, Del., a corporation of Delaware
No Drawing. Filed Jan. 17, 1963, Ser. No. 252,057
8 Claims. (Cl. 260—308)

This invention relates to 1,2'-bibenzotriazoles and to a method for their preparation.

Polynuclear organic nitrogen compounds constitute a useful class of organic compounds, many members of which have biological activity and/or are dyes or dye intermediates. However, the utility of many polynuclear compounds having several nitrogen atoms is somewhat limited because of their susceptibility to degradation in the presence of hydrolytic or electrophilic substitution reagents. In contrast, compounds containing triazole rings withstand such degradation, e.g., in the presence of nitric acid. Therefore, new polynuclear compounds containing triazole rings and methods of preparing them are highly desirable.

The electrophilic reagent-stable compounds of this invention are 1,2'-bibenzotriazoles of the formula

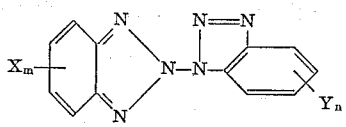

wherein X and Y each represent nitro ($NO_2$), halogen of atomic number 9–35 (fluorine, chlorine or bromine), alkyl of up to 18 carbons (i.e., 18 carbons or less) or the butadienylene group, which forms an extended aromatic structure with the benzo moiety to which it is attached; and $m$ and $n$ are cardinal numbers of 0–2 (i.e., 0, 1 or 2). Of course when either or both of X and Y are the butadienylene group, $m$ and/or $n$, as the case may be, must be 2.

Suitable alkyl substituents for the 1,2'-bibenzotriazoles of this invention are, e.g., methyl, ethyl, isopropyl, pentyl heptyl, decyl, dodecyl, tetradecyl and octadecyl.

Compounds of the above formula, wherein X and Y are nitro, halogen of atomic number 9–35, particularly chlorine and bromine, or alkyl of up to 7 carbons are preferred; and especially preferred individual compounds are 1,2'-bibenzotriazole and tetranitro-1,2'-bibenzotriazole, i.e., the compound of the foregoing formula wherein X and Y are nitro and $m$ and $n$ are each 2.

The process for obtaining 1,2'-bibenzotriazoles, other than those wherein X and/or Y are nitro, involves the following steps, which are illustrated schematically with the intermediates used in preparing unsubstituted 1,2'-bibenzotriazole:

(a) Reaction of a benzotriazole with hydroxylamine-O-sulfonic acid to form a corresponding 2-aminobenzotriazole.

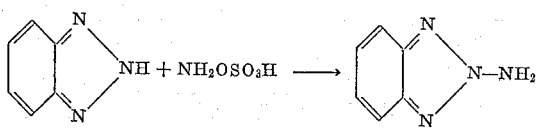

(b) N-o-nitrophenylation of the 2-aminobenzotriazole with an o-halonitrobenzene wherein the ortho halogen (A) is fluorine, chlorine, bromine, or iodine.

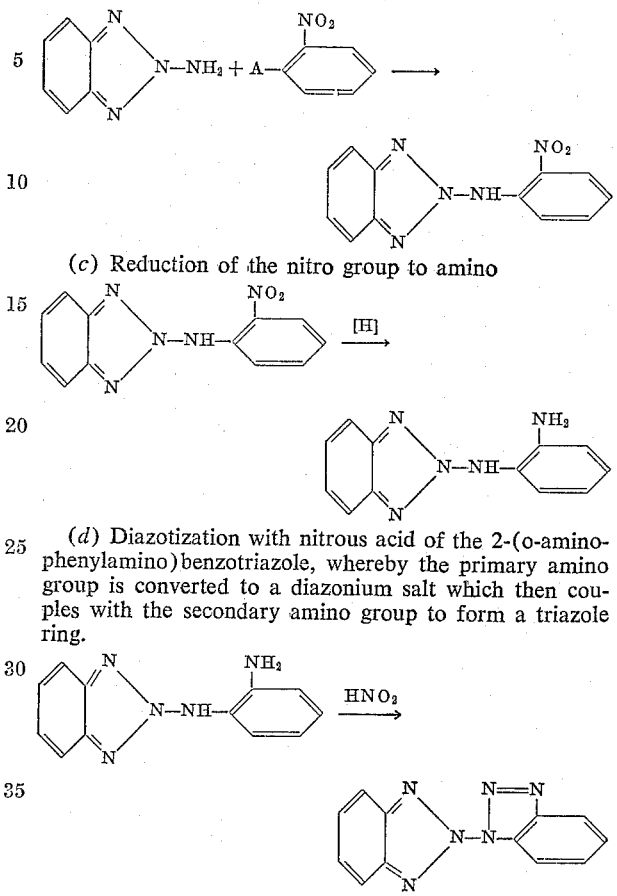

(c) Reduction of the nitro group to amino (d) Diazotization with nitrous acid of the 2-(o-aminophenylamino)benzotriazole, whereby the primary amino group is converted to a diazonium salt which then couples with the secondary amino group to form a triazole ring.

The above-depicted products of steps (a), (b) and (c) are new compounds which constitute another embodiment of this invention.

The reaction of a benzotriazole with hydroxylamine-O-sulfonic acid to replace the triazole hydrogen with a primary amino group is accomplished by admixture of the acid with a solution of the triazole in aqueous alkali (i.e., an aqueous solution of alkali metal hydroxide). Although application of heat is not essential to effect reaction between the benzotriazole and acid, heating the reaction mixture to boiling reduces reaction time from about 16 hours to about 5–60 minutes. The reactants are normally used in about stoichiometrically equivalent proportions, i.e., a 1:1:2 molar ratio of benzotriazole:hydroxylamine-O-sulfonic acid:alkali, but an excess of benzotriazole or the sulfonic acid and alkaline reagent can be employed. The product of the reaction crystallizes on cooling of the reaction mixture, is separated by usual methods such as filtration, and is purified by recrystallization from a suitable organic solvent. Generally, the initial product consists of a mixture of isomeric N-aminobenzotriazoles, i.e., the 1-amino, 2-amino and 3-amino isomers, since a benzotriazole starting material, though having the properties of a single compound by virtue of a delocalized triazole ring hydrogen (cf. Richter's "Organic Chemistry," vol. IV, Elsevier Publishing Co., 1947), can nevertheless form mono-substituted derivatives having the substituent attached to any one of the three nitrogen atoms of the triazole ring. In the instance of unsubstituted benzotriazole only two isomeric N-aminobenzotriazoles are obtained, i.e., 1-aminobenzotriazole and 2-aminobenzotriazole, the 1 and 3 positions being spatially identical.

The 2-aminobenzotriazole products, which are of primary interest in the present invention, can be separated from their isomers and purified by fractional crystallization.

N-o-nitrophenylation of the 2-aminobenzotriazole is accomplished by mixing it with the o-halonitrobenzene in the presence of a hydrogen halide acceptor (e.g., an alkali metal base or basic salt) and heating the mixture at a temperature in the range 125–250° C. A purified 2-aminotriazole or the crude product (i.e., unrecrystallized) from step (a) can be used in this step. A solvent medium can be employed if desired, but it is not necessary. It is generally desirable to employ about stoichiometrically equivalent amounts of the aminobenzotriazole and the halogen compound with at least an equivalent of the hydrogen halide acceptor, and an excess of the acceptor is often beneficial. However, to insure complete conversion of the aminotriazole, an excess of the halogen compound is used together with an amount of hydrogen halide acceptor at least stoichiometrically equivalent to the aminotriazole. The 2-(nitrophenylamino)benzotriazole product can be isolated by washing it with water or an aqueous solvent and purified by recrystallization from a suitable solvent.

Reduction of the 2-(o-nitrophenylamino)benzotriazole is accomplished in a conventional manner either by use of a reducing agent (e.g., an aqueous solution of sulfide, such as sodium sulfide) or by catalytic hydrogenation at room temperature using low pressure hydrogen, a catalyst such as palladium-on-charcoal and a suitable solvent medium such as alcohol or tetrahydrofuran. The resultant 2-(o-aminophenylamino)benzotriazole is purified by recrystallization in a suitable solvent.

Reaction of the 2-(o-aminophenylamino)benzotriazole with nitrous acid is carried out under usual diazotization conditions. (For example, see Lucas and Pressman, "Principles and Practice in Organic Chemistry," John Wiley and Sons, New York, 1949, chapter 34.) In a typical procedure, the aminophenyl compound is dissolved in an excess of aqueous mineral acid such as hydrochloric, hydrobromic, sulfuric or nitric acid, and aqueous sodium nitrite is added thereto at a reaction temperature below about 20° C., generally 0–10° C. The aminophenyl and nitrite reactants are preferably used in stoichiometrically equivalent amounts and the mineral acid in about a 2- to 10-fold excess of the equivalent amount. Under these conditions the formation of the diazonium salt and its subsequent intramolecular coupling with the ortho secondary amino group take place readily, and the product obtained as a solid precipitate in the reaction mixture is the 1,2'-bibenzotriazole. The solid product is separated by usual means such as filtration, and is purified conventionally by recrystallization in a suitable solvent.

Although it is preferred that the 2-(o-nitrophenylamino)benzotriazole from step (b) and the 2-(o-aminophenylamino)benzotriazole from step (c) of the above process be isolated and purified prior to the reduction and diazotization steps, respectively, this is not essential to the operability of the process of this invention.

All but the nitro-substituted bibenzotriazoles of this invention can be prepared by starting with the appropriate benzotriazole and o-nitrohalobenzene in steps (a) and (b), respectively, of the process outlined above. The benzotriazoles and o-nitrohalobenzenes which can be thus employed are of the formulas

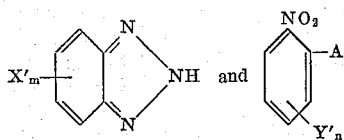

respectively, wherein X' and Y' each represent fluorine, chlorine, bromine, alkyl of up to 18 carbons or the butadienylene group, and A is a halogen. The nitro derivatives cannot be prepared by this procedure, because the reduction step in the synthesis can convert to primary amino any nitro group in addition to that required in the ortho position to the halogen, and thus lead not only to loss of such nitro group per se but also to undue complication in the subsequent diazotization step.

The 1,2'-bibenzotriazoles of this invention are resistant to degradation by electrophilic reagents normally used to bring about substitution on benzenoid rings. Therefore, by means of nitric acid, for example, the parent compound, 1,2'-bibenzotriazole, is readily converted to a tetranitro derivative having nitro substituents on each of the two benzo moieties, as illustrated in Example 2.

The 1,2'-bibenzotriazoles are solids of relatively high melting point which undergo thermal decomposition at or above the melting point, generally in the range 125–275° C., yielding molecular nitrogen and the correspondingly substituted dibenzo-1,3a,6,6a-tetraazapentalenes, which are thermally stable compounds of the formula:

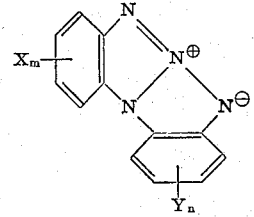

The following examples further illustrate the preparation and properties of the new compounds of this invention.

EXAMPLE 1

*1,2'-bibenzotriazole*

A. *2-aminobenzotriazole.*—To a solution of 10 g. (0.084 mole) of benzotriazole in 170 ml. of 1 N aqueous sodium hydroxide was added rapidly 10 g. (0.088 g. mole) of hydroxylamine-O-sulfonic acid at room temperature. The initially cloudy mixture clarified rapidly and was then heated to boiling in about 5 minutes and held at the boiling point for 12 minutes. The mixture was cooled to 5° C. under an atmosphere of nitrogen and kept that way for 64 hours. The resultant crystalline precipitate was collected on a filter and dried under vacuum at room temperature in the presence of phosphorus pentoxide. The crystalline product, M.P. 107–113° C., was identified by infrared and ultraviolet spectroscopy as 2-aminobenzotriazole. After recrystallization from a mixture of diethyl ether and petroleum ether the product melted at 117–119° C.; weight, 0.55 g.

| Anal. for $C_6H_6N_4$ | C | H | N | Mol. wt. |
|---|---|---|---|---|
| Calc'd | 53.7 | 4.51 | 41.8 | 134 |
| Found | 54.0 | 4.89 | 42.2 | 136 |

In other experiments involving boiling cycles of 10–40 minutes and cooling periods at 5° C. of less than an hour, the initial crystalline product was obtained in yields up to about 20%. Ether extraction of samples of the aqueous filtrate made alkaline with NaOH yielded 1-amino-benzotriazole, M.P. 84° C. [cf. Trave et al., Chem. Abstracts 55, 9382 (1961)].

B. *2-(o-nitrophenylamino)benzotriazole.*—A slurry of 2.68 g. (0.02 g. mole) of 2-amino-benzotriazole, 3.0 g. (0.021 g. mole) of o-fluoronitrobenzene and 3.28 g. (0.04 g. mole) of anhydrous sodium acetate was heated during 5 hours from 160° to 205° C. and then held at the latter temperature for 4.5 hours. The mixture was cooled to room temperature and aqueous ethanol was added, a yellow-orange crystalline solid being thus obtained. The solid was separated by filtration and recrystallized from ethanol to yield 0.17 g. of bright yellow crystals, M.P. 144–145° C.

| Anal. for C₁₂H₉N₅O₂ | C | H | N |
|---|---|---|---|
| Calc'd | 56.5 | 3.55 | 27.4 |
| Found | 56.5 | 3.47 | 26.8 |

In another experiment a mixture of 34 g. (0.25 g. mole) of 2-aminobenzotriazole, 35 g. (0.25 g. mole) of o-fluoronitrobenzene, 25.4 g. (0.24 g. mole) of anhydrous sodium carbonate and 120 ml. of dimethylformamide (B.P. 153° C.) was refluxed under nitrogen for 2 hours. The red-brown reaction mixture was cooled to room temperature and poured into 2.5 liters of water, and the yellow solid thus precipitated was filtered, washed with water and recrystallized from 95% ethanol, giving 55 g. of 2-(o-nitrophenylamino)benzotriazole, M.P. 144–145° C. When o-fluoronitrobenzene was replaced with o-chloronitrobenzene in the above procedure, the results were essentially the same. Similar results are obtained when o-bromo- and o-iodonitrobenzene are employed.

Attempts were made to react 1-aminobenzotriazole with each of o-fluoro-, o-chloro- and o-bromonitrobenzene under essentially the same conditions employed above in part B; however, no 1-(o-nitrophenylamino)benzotriazole was obtained. Hence, the process of this invention cannot be used to prepare 1,1'-bibenzotriazole.

C. *2-(o-aminophenylamino)benzotriazole.*—A mixture of 10.2 g. (0.04 g. mole) of 2-(o-nitrophenylamino)benzotriazole, 0.3 g. of 10% palladium-on-charcoal catalyst and 75 ml. of tetrahydrofuran was shaken at room temperature in a glass pressure vessel under 40 lb./sq. in. of hydrogen pressure. Hydrogen uptake was rapid, the theoretical amount being consumed in 10 minutes. The mixture was filtered and the filtrate was evaporated nearly to dryness under nitrogen. The dark partially-crystalline residue was taken up in 95% ethanol, treated with charcoal, filtered and diluted with water. Tan crystalline leaflets were obtained: weight, 7 g.; M.P. 100° C. dec. The product was recrystallized from ethanol-water, M.P. 106° C.

| Anal. for C₁₂H₁₁N₅ | C | H | N |
|---|---|---|---|
| Calc'd | 64.0 | 4.92 | 31.1 |
| Found | 63.1 | 5.16 | 31.1 |

2-(o-aminophenylamino)benzotriazole was also obtained by reduction of the nitro compound with sodium sulfide in a conventional manner.

D. *1,2'-bibenzotriazole.*—A solution of 6.0 g. (0.0266 g. mole) of 2-(o-aminophenylamino)benzotriazole in 250 ml. of 1 N hydrochloric acid was cooled to 0° C. and a solution of 1.80 g. (0.026 g. mole) of sodium nitrite in water was added dropwise with stirring. The gray precipitate was collected on a filter, dissolved in ether, and the solution treated with charcoal and filtered. The filtrate was evaporated to dryness and the residue was recrystallized from aqueous ethanol, giving 3.0 g. of pale tan crystals, M.P. 123.5–124.5° C.

| Anal. for C₁₂H₈N₆ | C | H | N | Mol. wt. |
|---|---|---|---|---|
| Calc'd | 61.0 | 3.41 | 35.6 | 236 |
| Found | 60.8 | 3.80 | 35.6 | 227 |
|  | 61.3 | 3.69 | 35.8 | 231 |

The U.V. spectrum in ethanol showed $\lambda_{max}$ 282, $\epsilon = 17,500$.

When treated with lithium aluminum hydride in tetrahydrofuran, 1,2'-bibenzotriazole was converted to benzotriazole. In contrast, the related 1,1'-bibenzotriazole described and claimed in coassigned application Serial No. 252,058, filed January 17, 1963 showed no reaction with lithium aluminum hydride under the same conditions.

EXAMPLE 2

*Tetranitro-1,2'-bibenzotriazole*

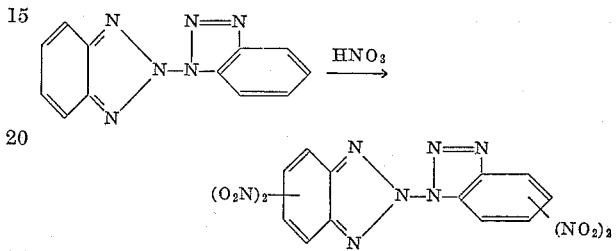

To 10 ml. of stirred red fuming nitric acid at room temperature was added 0.5 g. (0.0021 g. mole) of 1,2'-bibenzotriazole, and the clear solution was heated on a steam bath for 1 hour. Addition of the cooled solution to ice water gave a light tan precipitate which was collected on a filter, washed with water and air-dried. The product (0.73 g.) was extracted with 300 ml. of hot 95% ethanol, leaving 0.25 g. of tetranitro-1,2'-bibenzotriazole.

| Anal. for C₁₂H₄N₁₀O₈ | C | H | N | Mol. wt. |
|---|---|---|---|---|
| Calc'd | 34.6 | 0.97 | 33.7 | 416 |
| Found | 35.0 | 1.22 | 34.1 | ¹ 380 |
|  |  |  |  | ¹ 395 |
|  |  |  |  | ² 448 |
|  |  |  |  | ² 463 |

¹ In ethylene chloride.   ² In benzene.

The foregoing nitration of 1,2'-bibenzotriazole, with relatively easy introduction of four nitro groups, is in marked contrast with the nitration of the related 1,1'-bibenzotriazole. Under essentially the conditions of Example 2, 1,1'-bibenzotriazole has yielded only a dinitro derivative.

The 1,2'-bibenzotriazoles of the formula

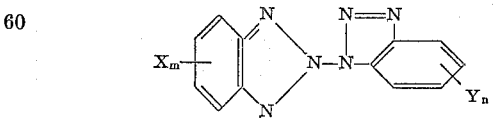

wherein X and Y are X' and Y', respectively, X' and Y' being as defined hereinabove, are easily prepared by substituting the appropriate X'-substituted benzotriazole and/or Y'-substituted o-halonitrobenzene for benzotriazole and o-fluoronitrobenzene, respectively, in the process of Example 1.

The following table presents representative X'-substituted benzotriazoles and Y'-substituted o-halonitrobenzenes that can be used variously as starting materials in the preparation of substituted 1,2'-bibenzotriazoles conforming to the foregoing general formula.

TABLE I

[Nomenclature of substituted benzotriazoles and o-halonitrobenzenes is given according to the Ring Index system, with the structural formulas and numbering depicted below]

| Benzotriazoles | o-Halonitrobenzenes |
|---|---|
| (structure, X'$_m$ substituted benzotriazole with N-1, 2N, N positions numbered 1-7) | NO$_2$ (structure, position 1 NO$_2$, position 2 A, Y'$_n$) (o-Halogen is in position 2) |
| 4-chlorobenzotriazole<br>5-chlorobenzotriazole<br>5-bromobenzotriazole<br>4-methylbenzotriazole<br>5-methylbenzotriazole<br>4,6-dimethylbenzotriazole<br>5,6-dimethylbenzotriazole<br>5-chloro-4-methylbenzotriazole<br>6-chloro-5-methylbenzotriazole | 2-chloronitrobenzene<br>2-bromonitrobenzene<br>2-chloro-5-fluoronitrobenzene<br>5-chloro-2-fluoronitrobenzene<br>2-bromo-4-chloronitrobenzene<br>2-bromo-5-chloronitrobenzene<br>4-bromo-2-chloronitrobenzene<br>5-bromo-2-chloronitrobenzene<br>2-chloro-3-ethylnitrobenzene<br>2-bromo-5-ethylnitrobenzene<br>2-bromo-6-ethylnitrobenzene |
| Naphthotriazoles (i.e., X is butadienylene) | o-Halonitronaphthalenes |
| (structure Naphtho[2,3-d]triazole) | (structure with NO$_2$ and A) |
| Naphtho[2,3-d]triazole | |
| (structure Naphtho[1,2-d]triazole) | 1-bromo-2-nitronaphthalene<br>2-fluoro-1-nitronaphthalene<br>2-chloro-3-nitronaphthalene |
| Naphtho[1,2-d]triazole | |

The compounds of this invention, i.e., 1,2'-bibenzotriazole and substituted 1,2'-bibenzotriazoles, are useful as intermediates to the corresponding dibenzo-1,3a,6,6a-tetraazapentalenes, which are ultraviolet light absorbers and hence are useful as filters for such light. Unlike the corresponding 1,3a,4,6a - tetraazapentalene, dibenzo-1,3a,6,6a-tetraazapentalene is essentially colorless, making it particularly useful as an ultraviolet light absorber, e.g., in sunburn creams and colorless transparent wrapping films. Also, the tetranitrodibenzo-1,3a,6,6a-tetraazapentalene obtained by pyrolysis of tetranitro-1,2'-bibenzotriazole is especially useful as a temperature-insensitive explosive.

Because of their thermal decomposition with formation of gaseous nitrogen, the 1,2'-bibenzotriazoles are also useful as high temperature blowing agents in the preparation of foamed polymeric structures, e.g., by dispersing them in thermoplastic or thermosetting materials and applying heat thereto, as in injection molding processes.

Since obvious modifications and equivalents in the invention will be evident to those skilled in the art, I propose to be bound solely by the appended claims.

The embodiments of the invention in which an exclusive property or privilege is claimed are defined as follows:

1. A compound of the formula:

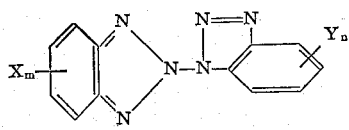

wherein X and Y each represent a member of the group consisting of halogen of atomic number 9–35, nitro, alkyl of up to 18 carbons and the butadienylene group, which forms an extended aromatic ring with the benzo moiety to which it is attached; and $m$ and $n$ each represent a cardinal number of 0–2.

2. 1,2'-bibenzotriazole.
3. Tetranitro-1,2'-bibenzotriazole.
4. 2-(o-nitrophenylamino)benzotriazole.
5. 2-(o-aminophenylamino)benzotriazole.
6. A process of preparing 1,2'-bibenzotriazoles which comprises:

(a) preparing a 2-aminobenzotriazole by boiling a mixture of hydroxylamine-O-sulfonic acid and a benzotriazole dissolved in aqueous alkali, said benzotriazole being of the formula

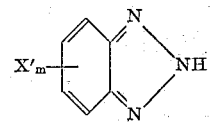

wherein X' is of the group consisting of halogen of atomic number 9–35, alkyl of up to 18 carbons and the butadienylene group, which forms an extended aromatic structure with the benzo moiety to which it is attached, and $m$ is a cardinal number of 0–2, (b) reacting the 2-aminobenzotriazole with an o-halonitrobenzene of the formula

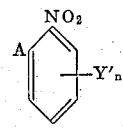

wherein A is halogen, Y' is of the same group as X', and $n$ is a cardinal number of 0–2, in the presence of a hydrogen halide acceptor at a temperature of 125–250° C., thereby preparing a 2-(o-nitrophenylamino)benzotriazole, (c) reducing the nitro group of the benzotriazole from step (b) to an amino group, and (d) diazotizing the 2-(o-aminophenylamino)benzotriazole from step (c).

7. The process of claim 6 wherein step (a) comprises reacting benzotriazole with hydroxylamine-O-sulfonic acid.

8. In a process of preparing 1,2'-bibenzotriazoles, the step of reacting a 2-aminobenzotriazole of the formula

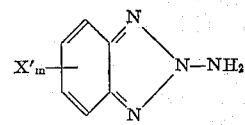

wherein X' is of the group consisting of halogen of atomic number 9–35, alkyl of up to 18 carbons and the butadienylene group, which forms an extended aromatic structure with the benzo moiety to which it is attached, and $m$ is a cardinal number of 0–2, with an o-halonitrobenzene of the formula

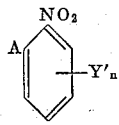

wherein A is a halogen, Y' is of the same group as X', and $n$ is a cardinal number of 0–2, in the presence of a hydrogen halide acceptor at a temperature of 125–250° C.

References Cited by the Examiner
UNITED STATES PATENTS
3,496,940  2/50  Hanson et al. _____ 95—2

OTHER REFERENCES

Elderfield: Heterocyclic Compounds, vol. 7 (New York, 1961), pages 386, 402–4, and 408–411.

Trave et al.: Chemical Abstracts, vol. 55, page 9382–3 (1961).

NICHOLAS S. RIZZO, *Primary Examiner.*

WALTER A. MODANCE, *Examiner.*